United States Patent Office 3,586,646
Patented June 22, 1971

3,586,646
CATION EXCHANGER WITH SPONGE STRUCTURE
Herbert Corte and Erhard Meier, Leverkusen, and Hans Seifert, Bergedorf Neukirchen, Germany, assignors to Farbenfabriken Bayer Aktiengesellschaft, Leverkusen, Germany
No Drawing. Filed Apr. 8, 1958, Ser. No. 727,045
Claims priority, application Germany, Apr. 20, 1957, F 22,878
Int. Cl. C08j 1/34
U.S. Cl. 260—2.2R                                15 Claims The present invention relates to cation exchangers and more particularly to cation exchangers on the base of cross-linked copolymers having sponge structure as well as to a process of producing such cation exchangers.

The cation exchangers can be divided into so-called weakly acid and strongly acid exchangers acording to the functional groups. Examples of weakly acid cation exchangers are cross-linked polymers containing carboxyl groups. These can for example be produced by copolymerization of olefinically unsaturated carboxylic acids, or carboxylic acid derivatives, such as for example acrylic acid, methacrylic acid, maleic acid, fumaric acid, esters or anhydrides of these acids, with cross-linking agents, if desired in the presence of other monomers, whereupon these copolymers are if necessary saponified. Compounds which serve as cross-linking agents are those which, like for example divinyl benzene and ethylene glycol methacrylate, contain several olefinic double bonds in the molecule. As well as weakly acid cation exchangers with a polymer base and containing carboxyl groups, there are also known exchangers having other functional groups, such as for example phosphonic acid or phosphinic acid groups, such as those obtained for example by the action of phosphorus trichloride on cross-linked polystyrenes in the presence of Friedel-Crafts catalysts and subsequent saponification or subsequent saponification and oxidation. Furthermore such exchangers may be produced by reaction of haloalkylated cross-linked polystyrene with trialkyl phosphites. Such processes are for instance disclosed in U.S. Patent specifications 2,340,110, 2,340,111, 2,409,861, 2,471,818, 2,764,561, 2,764,564.

Strongly acid cation exchangers with a polymer base are usually obtained by sulphonation of cross-linked polymers, such as for example cross-linked polystyrene. Such strongly acid cation exchangers are disclosed in U.S. patent specifications 2,366,007, 2,466,675, 2,500,149, 2,631,127, 2,664,801.

The known cation exchangers have a gel structure and are usually transparent lustrous products which are frequently produced in bead form. With such cation exchangers, the exchanged velocity, the capacity for ion exchange with large ions and catalytic efficiency, inter alia, decrease with increasing cross-linking.

Attempts have been made to counteract this by carrying out the smallest possible cross-linking of the exchanger molecules. This procedure is, however, subject to limit, in that the mechanical properties, especially the strength, of the exchangers are impaired and in addition the change in volume of the exchanger during the charging or regeneration increases considerably with decreasing cross-linking. These disadvantegous properties of weakly cross-linked cation exchangers make it difficult or even impossible for them to be used technically.

It has now been found that these disadvantages can be obviated in a simple manner by carrying out the polymerization of the cation exchangers, or the initial products used for the production of cation exchangers, in the presence of at least 10% (based on the weight of the monomers) of solvents which will dissolve the monomer but are not able to dissolve linear aromatic vinyl polymers such as polystyrene. Such organic liquids, which are hereinafter referred to as "non-solvents," are for example aliphatic hydrocarbons, alcohols, ethers, nitro-compounds.

The polymers obtained in the presence of at least 10% but preferably at least 30% of these organic liquids are opaque and, depending on the amount of non-solvents used, are glossy to dull. The upper limit of the amount of non-solvents as based on the weight of the monomers is preferably 200 to 300% and depends on the amount of cross-linking agents applied in the polymerization mixture. These polymers have a sponge structure, i.e. they are permeated by small veins, into which non-solvents and non-swelling agents are also able to penetrate. Whereas the normal gel-like polymers are not able to absorb the non-solvents and therefore do not swell therein, the sponge-like polymers also absorb these organic liquids and even show a swelling because of their sponge structure.

This sponge structure of the polymers is also maintained during subsequent chemical reactions to which they may be subjected, such as for example saponification or sulphonation, without destruction of the individual particles.

For the production of cation exchangers having sulfonic acid, phosphonic acid or phosphinic acid groups there may be used copolymers of monovinyl aromatic compounds and cross-linking agents having several olefinically unsaturated groups. All monovinylaromatic compounds, such as for example styrene, methyl styrene, vinyl anisole, vinyl naphthalene, as well as mixtures thereof can be used for this purpose. Polyethylenically unsaturated compounds (that is to say compounds containing at least two vinylidene $$(CH_2=C<)$$

or ethylene

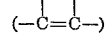

groups)
such as for example divinyl benzene, trivinyl benezene, ethylene glycol dimethacrylate, ethylene glycol diacrylate, diallylmaleate, divinylether, polymerizable esterification products of dihydric alcohols, such as glycol, diethyleneglycol, butanediol, and $\alpha$-$\beta$-ethylenically unsaturated acids such as maleic, fumaric acids, such as glycol dimaleate and divinyl ketone can be considered as cross-linking agents. The amounts of cross-linking agents to be used can fluctuate within wide limits, but generally between about 0.5 to 50% by weight as based on the total amount of monomers are used. In the case of aromatic compounds having several vinyl groups, these percentages can, however, be exceeded. It is even possible to use these monomers exclusively for the production of the polymers. For the production of cation exchangers with carboxylic acid groups the aforementioned cross-linking agents, preferably polyvinyl aromatic compounds, are copolymerized with monoethylenically unsaturated caboxylic acids, such as acrylic acid, methacrylic acid, half esters of lower aliphatic alcohols with monomethylenically unsaturated polycarboxylic acids such as maleic acid, fumaric acid or mixtures thereof. It is also possible to use the completely esterified derivatives of such acids or the anhydrides thereof with subsequent saponification of the copolymers obtained.

Substances which can be used as non-solvents are for example aliphatic hydrocarbons such as benzine (B.P. 100 to 140° C.), white spirit (B.P. 160 to 196° C.), dodecane, aliphatic and cycloaliphatic alcohols, cyclohexanol, methanol, amyl alcohol, dodecanol, olein alcohol, aliphatic nitro compounds such as nitromethane, nitropropane, nitrohexane, ethers, such as diethylether, dibutylether, diamylether. For producing the polymers, the monomers can be dissolved in the said non-solvents and thereafter polymerized in the presence of a free radical catalyst. For the production of bead-shaped polymers, the solutions of the monomers are suspended in aqueous medium and then polymerized. In this case, it is preferred to use non-solvents which have only slight solubility in water, such as for example n-decanol, olein alcohol, aliphatic hydrocarbons such as white spirit or those which are preferentially dissolved in the monomer mixture, such as for example n-amyl alcohol. The free radical catalysts are those which give off oxygen, such as for example benzoyl peroxide, cumene, hydroperoxide, tertiary butyl peroxide other per-compounds, e.g. sodium persulfate and azo-compounds such as azodiisobutyric acid dinitrile. It is also possible for this purpose to use Redox systems which in known manner consist of a combination of compounds giving off oxygen and compounds having reducing properties.

The polymerization is preferably carried out at temperatures from 30 to 150° C. The cross-linked polymers then obtained can be subjected to the further reactions such as saponification, sulphonation, reaction with $PCl_3$ according to known processes as they are disclosed in the above cited specifications, these reactions being carried out either without or after having removed the non-solvents.

EXAMPLE 1

A mixture of 382 g. of acrylic acid methyl ester, 218 g. of technical divinyl benzene (55%, the remainder being ethyl styrene), 240 g. of n-decanol and 5 g. of benzoyl peroxide was suspended in 1.2 litres of water containing 0.05% of methyl cellulose and subjected to pearl polymerization at 70° C. After gelling of the pearls obtained polymerization was continued for another 3 hours at 90° C. and thereafter the resulting pearls were dried in vacuo and the n-decanol distilled off at 100° C. The pearl polymer thus obtained was boiled under reflux for 20 hours after the addition of 500 cc. of 40% KOH and 300 cc. of methanol. After the reaction liquid had been filtered with suction, the white non-transparent pearls were stirred with excess 10% HCl and then washed with water. Yield: 1500 cc. of a weakly acid cation exchanger.

The spongy structure of the product can be seen from the fact that it reacts for example with 1% $Na_2HPO_4$ solution about 6 times as quickly, with formation of $NaH_2PO_4$, as a corresponding cation exchanger with a gel structure produced without the addition of n-decanol. In addition, the cation exchanger in accordance with the invention, in spite of its approximately 20% divinyl benzene cross-linking, reacts with $Na_2HPO_4$ solution at approximately the same speed as a cation exchanger which is of the same type and with a gel structure but which is cross-linked with only 6% of divinyl benzene, but has the advantage over this latter exchanger of only swelling by 25% in this reaction, whereas the increase in volume of the 6% cross-linked exchanger is 130%.

In the above process the n-decanol may be replaced by the same amount of white spirit.

EXAMPLE 2

A mixture of 500 g. of maleic acid anhydride, 310 g. of styrene, 190 g. of technical divinyl benzene (55%, the remainder ethyl styrene) and 100 g. of a benzine fraction with a boiling point of 100–140° C. was heated for 24 hours to 70° C. Polymerization took place to yield a white, translucent compact mass which, after comminution, was heated for 10 hours with 5% NaOH in excess at 95° C. After treatment with excess 5% HCl and washing with water, a weakly acid cation exchanger having a spongy structure was obtained, which neutralised N/10 NaOH about 4 times as quickly as an exchanger having a gel structure produced under the same conditions but without addition of benzine.

EXAMPLE 3

A mixture of 327 g. of styrene, 73 g. of technical divinyl benzene (55%, the remainder ethyl styrene), 400 g. of white spirit (B.P. 160–196° C.) and 5 g. of benzoyl peroxide was suspended in 1.2 liters of water in which 0.1% of methyl cellulose was dissolved, and subjected to pearl polymerization at 65° C. After the beads had gelled, heating was continued for 4 hours at 90–95° C. to complete the polymerization.

300 g. of the dried beads thus obtained were heated with 900 cc. of concentrated $H_2SO_4$ ($d_{20}$ ° C.=1.840) for 3 hours at 80° C. and then for 3 hours at 100° C. while stirring. After cooling, the material obtained was slowly diluted with water and the reaction product washed with de-salted water until free from acid. Yield: 1300 cc. of a yellowish opaque strongly acid cation exchanger.

The spongy structure of the exchanger will for example be appreciated from its high activity as an esterification catalyst. For example, when stearic acid is being esterified with n-butanol by means of this cation exchanger, a 95% conversion was obtained in a time in which a cation exchanger with a gel structure produced in a corresponding manner but without the addition of white spirit only produced a conversion of 30%.

If the addition of substances which do not swell the polymer is chosen to be very high in the polymerization, cation exchangers are obtained which have very high porosity, which can easily be comminuted to an impalpable powder and in this form are for example particularly suitable for medicinal use or for dispensing in dry form for the purpose of obtaining extremely pure solutions.

EXAMPLE 4

A mixture of 450 g. of styrene, 50 g. of trivinylbenzene, 300 g. di-n-butylether and 5 g. of benzoylperoxide was suspended in 1.5 litres of water, containing 0.4 g. of gelatine. The mixture was stirred and heated at temperatures between 65 and 70° C. over a period of 8 hours, then at temperatures between 90 to 95° C. over a period of 4 hours and finally cooled to room temperature. The obtained bead polymer with a sponge-like structure was separated by filtering, washed with water and was dried in vacuo at temperatures between 100 and 110° C. 300 g. of the said pearl polymer were swelled in 700 cc. of carbontetrachloride over a period of 4 hours and had added thereto 1000 g. of $PCl_3$ and 400 g. of $AlCl_3$ in portions. The mixture was refluxed while stirring until the development of hydrogenchloride had ceased. The reaction product was sucked off and the isolated reaction product was washed several times with water. Then the reaction product was sucked off again and was suspended in 3 litres of water whereafter it was heated for 2 hours at 70° C. The reaction product was then isolated by filtration. There were obtained 1400 cc. of a yellowish opaque cation exchanger which is distinguished by a high reaction velocity when using it for the decarbonisation of natural waters.

The aforementioned cation exchanger may be oxidised by means of bromine water whereby a cation exchanger with phosphonic acid groups is produced. This exchanger is also opaque and has a sponge structure. It is distinguished by high reaction velocity.

We claim:
1. In a process for preparing a cation exchange resin having a water-insoluble matrix and cation exchange groups bonded thereto which are selected from the group consisting of sulfonic acid, carboxylic acid, phosphoric acid, and phosphonic acid groups, the improvement comprising employing as said matrix a solid copolymer of spongy structure which is permeated by small veins into which liquids are able to penetrate, which matrix is prepared by copolymerizing a mixture consisting essentially of (1) a monoethylenically unsaturated monomer selected from the group consisting of a monovinyl carbocyclic aromatic compound, a monoethylenically unsaturated carboxylic acid, a monoester of a lower aliphatic alcohol and a monoethylenically unsaturated polycarboxylic acid, a completely esterified monoethylenically unsaturated polycarboxylic acid, and an anhydride of a monoethylenically unsaturated polycarboxylic acid, with (2) a polyethylenically usaturated monomer selected from the group consisting of a polyvinyl carbocyclic aromatic compound, an ester of a dihydric alcohol and an α-β-ethylenically unsaturated carboxylic acid, diallyl maleate, divinyl ether, and divinyl ketone; the aforesaid copolymerization being conducted while the monomers are dissolved in 10 to 300% by weight, based on monomer weight, of an organic liquid which is a solvent for said monomers but is unable to dissolve linear aromatic vinyl polymers.

2. The process of claim 1 wherein said organic liquid is selected from the group consisting of an aliphatic hydrocarbon, an aliphatic alcohol, a cycloaliphatic alcohol, an aliphatic ether, and an aliphatic nitro compound.

3. The process of claim 1 wherein said monomers dissolved in said organic liquid are suspended in an aqueous medium and polymerization is effected in said suspension to obtain the copolymer in the form of opaque sponge-like beads.

4. The process of claim 1 wherein said cation exchange groups are carboxyl groups, said monoethylenically unsaturated monomer is an ester of a monoethylenically unsaturated carboxylic acid, said polyethylenically unsaturated monomer is a polyvinyl carbocyclic aromatic compound, and said organic liquid is present in an amount of 10 to 200% by weight based on monomer weight.

5. The process of claim 1 wherein said cation exchange groups are sulfonic acid groups, said monoethylenically unsaturated monomer is a monovinyl carbocyclic aromatic compound, and said polyethylenically unsaturated monomer is a polyvinyl carbocyclic aromatic compound.

6. The process of claim 1 wherein said cation exchange groups are carboxyl groups, said monoethylenically unsaturated monomer is an anhydride of a dicarboxylic acid, and said polyethylenically unsaturated monomer is a polyvinyl carbocyclic aromatic compound.

7. The process of claim 1 wherein said cation exchange groups are carboxyl groups, said monoethylenically unsaturated monomer is a carboxylic acid anhydride, said polyethylenically unsaturated monomer is divinyl benzene, and said organic liquid is benzine boiling at 100–140° C.

8. The process of claim 1 wherein said cation exchange groups are carboxyl groups, said monoethylenically unsaturated monomer is methyl acrylate, said polyethylenically unsaturated monomer is divinyl benzene, and said organic liquid in n-decanol.

9. A process of producing a cation exchange resin having sulfonic acid groups which comprises copolymerizing a mixture consisting of styrene and divinyl benzene or trivinylbenzene while said monomers are dissolved in 10–300% by weight, based on monomer weight, of an organic liquid which is a solvent for said monomers but is unable to dissolve linear carbocyclic aromatic vinyl polymers, recovering from said copolymerization a solid opaque copolymer matrix of spongy structure which is permeated by small veins into which liquids are able to penetrate, and then sulfonating said copolymer matrix, the sponge structure of the latter being retained in the sulfonated product.

10. The process of claim 9 wherein said organic liquid is either white spirit or di-n-butylether.

11. A cation exchange resin consisting of a water-insoluble matrix and cation exchange groups bonded thereto which are selected from the group consisting of sulfonic acid, carboxylic acid, phosphoric acid, and phosphonic acid groups, wherein as said matrix there is employed a solid opaque copolymer of spongy structure which is permeated by small veins into which liquids are able to penetrate, which matrix is prepared by copolymerizing a mixture consisting essentially of (1) a monoethylenically unsaturated monomer selected from the group consisting of a monovinyl carbocyclic aromatic compound, a monoethylenically unsaturated carboxylic acid, a monoester of a lower aliphatic alcohol and a monoethylenically unsaturated polycarboxylic acid, a completely esterified monoethylenically unsaturated polycarboxylic acid, and an anhydride of a monoethylenically unsaturated polycarboxylic acid, with (2) a polyethylenically unsaturated monomer selected from the group consisting of a polyvinyl carbocyclic aromatic compound, an ester of a dihydric alcohol and an α-β-ethylenically unsaturated carboxylic acid, diallyl maleate, divinyl ether, and divinyl ketone, the aforesaid copolymerization being conducted while the monomers are dissolved in 10 to 300% by weight, based on monomer weight, of an organic liquid which is a solvent for said monomers but is unable to dissolve linear carbocyclic aromatic vinyl polymers.

12. The cation exchange resin of claim 11 wherein said organic liquid is selected from the group consisting of an aliphatic hydrocarbon, an aliphatic alcohol, a cycloaliphatic alcohol, an aliphatic ether, and an aliphatic nitro compound.

13. The cation exchange resin of claim 11 wherein said copolymer is obtained in the form of sponge-like beads by copolymerizing the monomers dissolved in said organic liquid while the latter is suspended in an aqueous medium.

14. The cation exchange resin of claim 11 wherein said cation exchange groups are carboxyl groups.

15. The cation exchange resin produced by the process of claim 9.

References Cited
UNITED STATES PATENTS

| | | | |
|---|---|---|---|
| 2,591,574 | 4/1952 | McBurney | 260—2.1 |
| 3,147,214 | 9/1964 | Kressman et al. | 210—24 |
| 2,798,053 | 7/1957 | Brown | 260—2.2 |

FOREIGN PATENTS

| | | | |
|---|---|---|---|
| 714,367 | 8/1954 | Great Britain | 260—2.2 |

HAROLD D. ANDERSON, Primary Examiner

U.S. Cl. X.R.

210—24R, 2.5R, 17A, 29.6R, 32.4R, 33.2R, 33.4PQ, 33.6PQ, 47UA, 63R, 78.5BB, 80.3R, 86.1R, 86.7R, 88.1P, 8.2C, 95R